United States Patent
Ye et al.

(10) Patent No.: US 8,198,917 B2
(45) Date of Patent: Jun. 12, 2012

(54) CURRENT SEGMENTATION CIRCUIT FOR OPTIMIZING OUTPUT WAVEFORM FOR HIGH SPEED DATA TRANSMISSION INTERFACE

(75) Inventors: Fei Ye, Chengdu (CN); Xiangyang Guo, Chengdu (CN); Guojun Zhu, Chengdu (CN)

(73) Assignee: IPGoal Microelectronics (SiChuan) Co., Ltd., High-Tech Incubation Park, Chengdu, Sichuan Province (CN)

( * ) Notice: Subject to any disclaimer, the term of this patent is extended or adjusted under 35 U.S.C. 154(b) by 413 days.

(21) Appl. No.: 12/500,603

(22) Filed: Jul. 10, 2009

(65) Prior Publication Data

US 2010/0104028 A1 Apr. 29, 2010

(30) Foreign Application Priority Data

Oct. 29, 2008 (CN) .......................... 2008 1 0046402

(51) Int. Cl.
*H03K 19/094* (2006.01)
(52) U.S. Cl. ................. 326/82; 326/24; 326/26; 326/31; 326/87; 327/108; 341/144

(58) Field of Classification Search .............. 326/82–83, 326/86–87, 115, 127; 327/108–112; 341/144–154
See application file for complete search history.

(56) References Cited

U.S. PATENT DOCUMENTS

| | | | | |
|---|---|---|---|---|
| 6,496,129 B2* | 12/2002 | Dedic et al. | ................... | 341/144 |
| 7,903,013 B2* | 3/2011 | Yamaguchi et al. | .......... | 341/144 |
| 2006/0061499 A1* | 3/2006 | Seo | ............................... | 341/144 |
| 2006/0071722 A1* | 4/2006 | Paillet et al. | .................... | 331/57 |

* cited by examiner

*Primary Examiner* — Shawki S Ismail
*Assistant Examiner* — Jany Tran

(57) ABSTRACT

The present invention provides a current segmentation circuit for optimizing output waveform from high speed data transmission interface, which comprises a four current sources controlled by four switches to segment current so as to control the rising and falling time of the high speed transmission data, and to match the delay of the current control signal and the delay of the data, wherein the four current sources are I1, I2, I3 and I4, and the current control switches are K1, K2, K3 and K4, wherein I1+I2=I3+I4, wherein the switches K1 and K3 control the current I1/I3 to flow into DP/DM line, and the switches K2 and K4 control the current I2/I4 to flow into DP/DM line. The present invention can depress overshoot and eliminate turning point in the waveform.

20 Claims, 6 Drawing Sheets

CURRENT SEGMENTATION CIRCUIT FOR OPTIMIZING OUTPUT WAVEFORM FOR HIGH SPEED DATA TRANSMISSION INTERFACE

BACKGROUND OF THE INVENTION

1. Field of Invention

The present invention relates to a high speed data transmission area, and more particularly to a current segmentation circuit for optimizing output waveform from high speed data transmission interface that can depress overshoot and eliminate turning point in the waveform.

2. Description of Related Arts

In data transmission area, with technology development, the conventional transmission rate can not meet the current demand. The high data transmission rate up to hundreds of Mb/s and even to a few Gb/s has been widely used.

High speed data transfer challenges the reliability of data transmission. The conventional high speed data transmission has two main problems: overshoot and the difficulty to control rising and falling time. The conventional current segmentation circuit can solve these two problems, but also bring a new one, which is the turning point in the waveform which will affect the reliability of data recovery.

The conventional high speed data transmission is based on the RC charge-discharge principle, which is to control the rising and falling time of high speed data by charging and discharging the "gate" of the switches of the differential data paths via a RC circuit. However, this technique will cause overshoot in the rising and falling edges and it is difficult to control the rising and falling time.

Referring to FIG. 1 of the drawings, a schematic view of a conventional RC charge-discharge principle is illustrated. Connect the input signal through a resistance to the "gate" of the MOS transistor switches (S1 and S2). The input falling time is controlled by the RC discharging process at the "gate", and the input rising time is controlled by the RC charging process. Due to the exponential characteristic of the RC circuit, the changing of the "gate" voltage is divided into a fast region and a slow region. In the fast region, due to the large current, the data line (output) is charged to a relatively high value very quickly, and thus during the slow process, the switch will further raise the voltage of the data line to allow the control signal to change, which is called the overshoot. Moreover, Due to the exponential characteristic of the RC circuit, it is also difficult to control the rising and falling time in the waveform.

Therefore, in order to solve the above-mentioned problems, a current segmentation circuit is introduced. The principle of the current segmentation circuit is illustrated as below. Charge the output data with small current during the fast region, and charge the output data with large current during the slow region, so as to depress the overshoot and easily control the rising and falling time. However, due to the discontinuity of the current, the turning point during the data rising and falling process will greatly affect the reliability of data recovery.

Referring to FIG. 5 of the drawings, the output of the conventional RC controlled high speed data transmission and an eye pattern thereof is illustrated. V (S1) and V (S2) are the "gate" voltage of the MOS transistors, wherein the exponential catachrestic of the RC circuit can be seen. V (dp)–V (dm) is the differential data of the high speed transmission, wherein the overshoot and relatively short rising and falling time are obvious, and even the R or C value is greatly changed, the rising and falling time still changes very little.

Referring to FIG. 6 of the drawings, the output of the current segmentation circuit controlled high speed data transmission and an eye pattern thereof is illustrated. V (K1), V (K2), V (K3) and V (K4) are the "gate" signal of four PMOS transistors. V (dp)–V (dm) is the differential data of the high speed transmission, wherein the overshoot is greatly depressed, but the there is obvious turning point during the rising and falling process.

Take the rising process of the differential data as an example, the existing of the turning point is explained as follows. When V (K1) is start to fall, V (K1) changes quickly. During this period, the exponentially increasing current I1 flow into DP line and the voltage of the differential data rises very quickly. During the period of V (K1) falling to a relatively low voltage, the current I2 controlled by V (K2) has not flow into DP line yet, so that the exponential characteristic of the RC circuit is obvious, that is to say the charging current to the DP line increases slowly, and the differential voltage also increases very slow. During the falling process of V (K2), the extra exponentially increasing current flows into DP line from I2, so as to depress the influence of the remaining exponential current I1. From the above explanation, it can be seen that the current segmentation circuit can depress the overshoot, but will inevitably produce turning point.

So far, there is no efficient high speed data transmission method that can depress the overshoot and do not produce turning point.

SUMMARY OF THE PRESENT INVENTION

An object of the present invention is to provide a current segmentation circuit for optimizing output waveform in high speed data transmission interface that can depress overshoot and eliminate turning point by matching the data delay with the current signal delay, so as to ensure the effectiveness of the high data transmission.

Accordingly, in order to accomplish the above object, the present invention provides a current segmentation circuit for optimizing output waveform from high speed data transmission interface, which comprises a four current sources structure working together with four switches to segment the output charging current so as to control the rising and falling time of the high speed transmission data, and to match the delay of the current control signal and the delay of the data.

In the four current sources controlling switches structure of the current segmentation circuit of the present invention, K1, K2, K3 and K4 are switches to control the output current, I1, I2, I3 and I4 are the current sources to provide the output current, DP and DM are differential data line. The switches K1 and K3 control the current I1/I3 to flow into DP/DM line, and the switches K2 and K4 control the current I2/I4 to flow into DP/DM line.

During the high speed data transmission, the current segmentation circuit uses the K1, K2, K3 and K4 to control the charging current to the output data lines. The switching sequence divides the rising and falling process of the data into different phases. In each phase, the data line is charged with different current produced via the switches so as to depress the overshoot. At the same time, the delay of the control signal of the switches is matched with the delay of the data, so that the discontinuity problem of the current is solved so as to eliminate the turning point.

The I1, I2, I3 and I4 are mirror current sources.

I1=I2=I3=I4.

The four current source controlling switches structure further comprises a data delay structure data_delay and a current control structure current_control. Referring to v(drive_A) and v(drive_C) in FIG. 7, the data delay structure adopts RS delay model that can quickly response the input falling edge to produce a pair of differential delay signals. This pair of delay signals produces a pair of "gate" control signals. Referring to v(drive_A), v(drive_B) and v(drive_C), v(drive_C) in FIG. 7, the current control structure produces two pairs of delayed current control signals to control I1, I2 and I3, I4 respectively. Match the series inverter in the data delay structure with the series inverter in the current control structure, so that the delay of the current control signal is matched with the delay of the data.

The benefit of the present invention is illustrated as follows. The present invention can depress overshoot and eliminate turning point by matching the data delay with the current signal delay, so as to ensure the effectiveness of the high speed data transmission. The present invention is particularly suitable to be used in high speed data transmission area that requires precise output waveform control, such as USB.

DETAILED DESCRIPTION OF THE PREFERRED EMBODIMENTS

Figure 1:
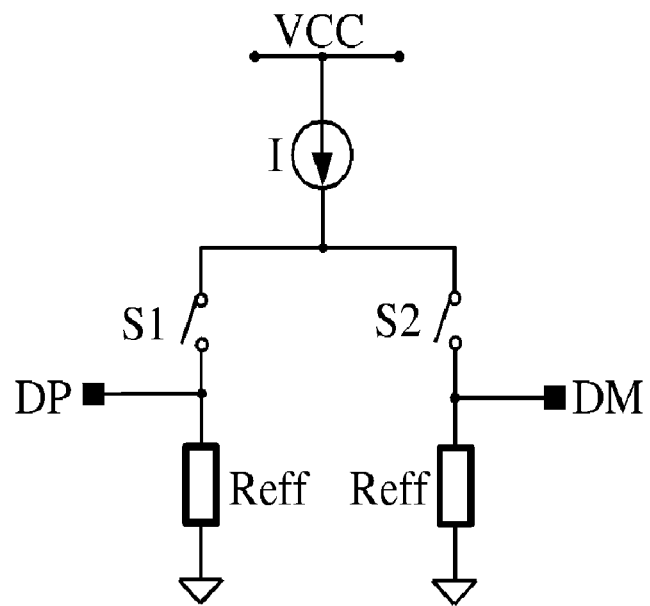
FIG. 1 is a schematic view of a conventional RC charge-discharge principle.
Figure 2:
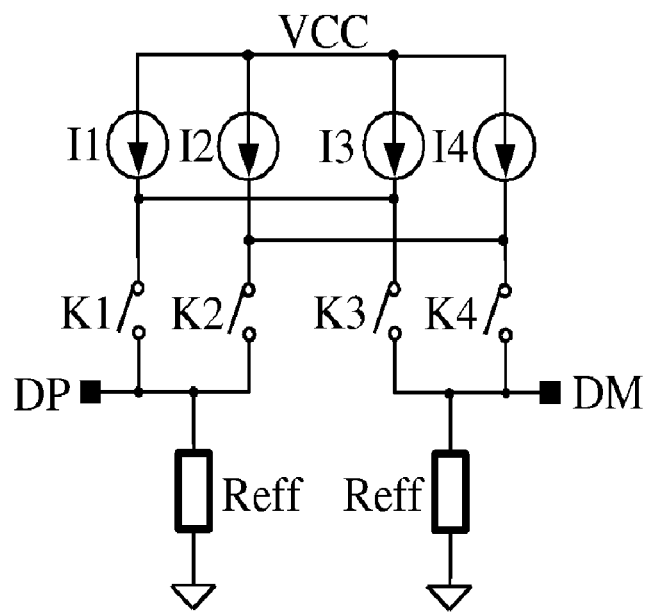
FIG. 2 is a schematic view of a current segmentation circuit for optimizing output waveform from high speed data transmission interface according to a preferred embodiment of the present invention.

Referring to FIG. 2 of the drawings, a schematic view of a current segmentation circuit for optimizing output waveform from high speed data transmission interface according to a preferred embodiment of the present invention is illustrated, in which the current segmentation circuit comprises a four current sources controlled by four switches to segment current so as to control the rising and falling time of the high speed transmission data, and to match the delay of the current control signal and the delay of the data, wherein the four current sources are I1, I2, I3 and I4, and the current controlled switches are K1, K2, K3 and K4, wherein I1+I2=I3+I4, wherein the switches K1 and K3 control the current I1/I3 to flow into DP/DM line, and the switches K2 and K4 control the current I2/I4 to flow into DP/DM line.

In the four current sources controlling switches structure of the current segmentation circuit of the present invention, K1, K2, K3 and K4 are switches, I1, I2, I3 and I4 are the current sources, DP and DM are differential data line. The switches K1 and K3 control the current I1/I3 to flow into DP/DM line, and the switches K2 and K4 control the current I2/I4 to flow into DP/DM line.

The I1, I2, I3 and I4 are mirror current sources.

$$I1=I2=I3=I4.$$

Figure 3:
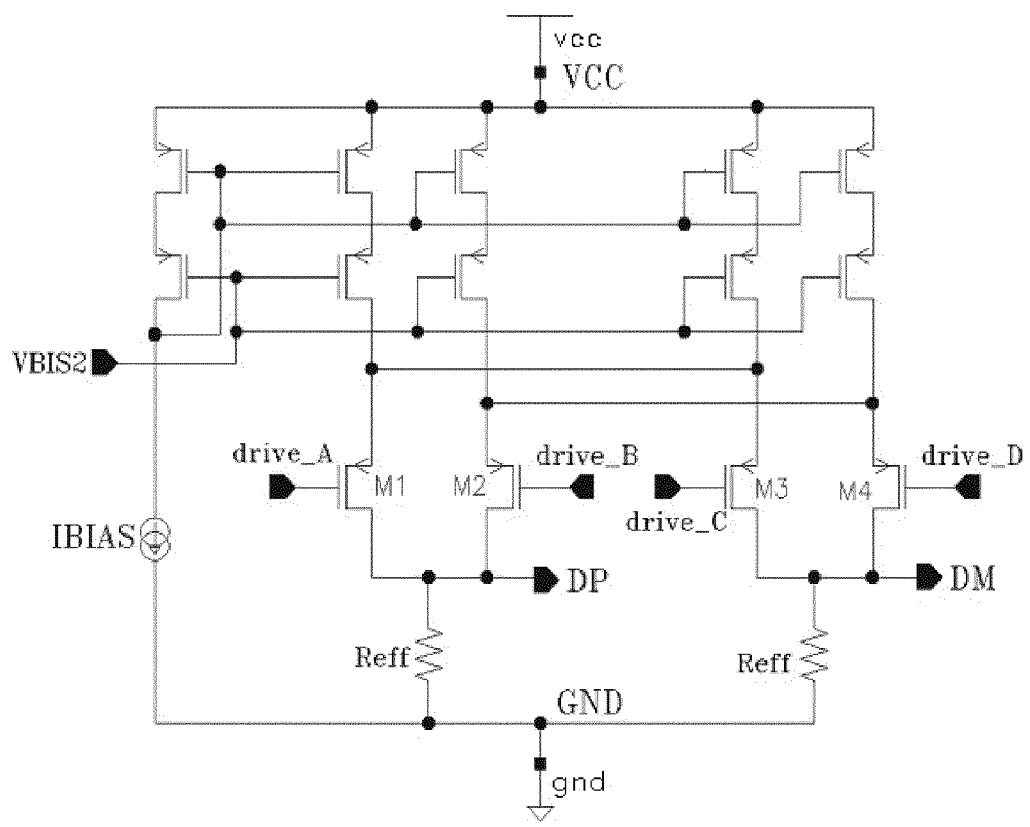
FIG. 3 is a detailed circuit of a current segmentation circuit according to the above preferred embodiment of the present invention.

Referring to FIG. 3 of the drawings, a detailed circuit of the current segmentation circuit of the present invention is illustrated, wherein the switch is embodied as PMOS transistor. M1, M2, M3, and M4 and "gate" control signal constitute four current controlled switches K1, K2, K3 and K4. The four current sources are mirror current sources with cascade structure, which is approximately ideal current source, wherein I1+I2=I3+I4, and preferably I1=I2=I3=I4.

Figure 4:
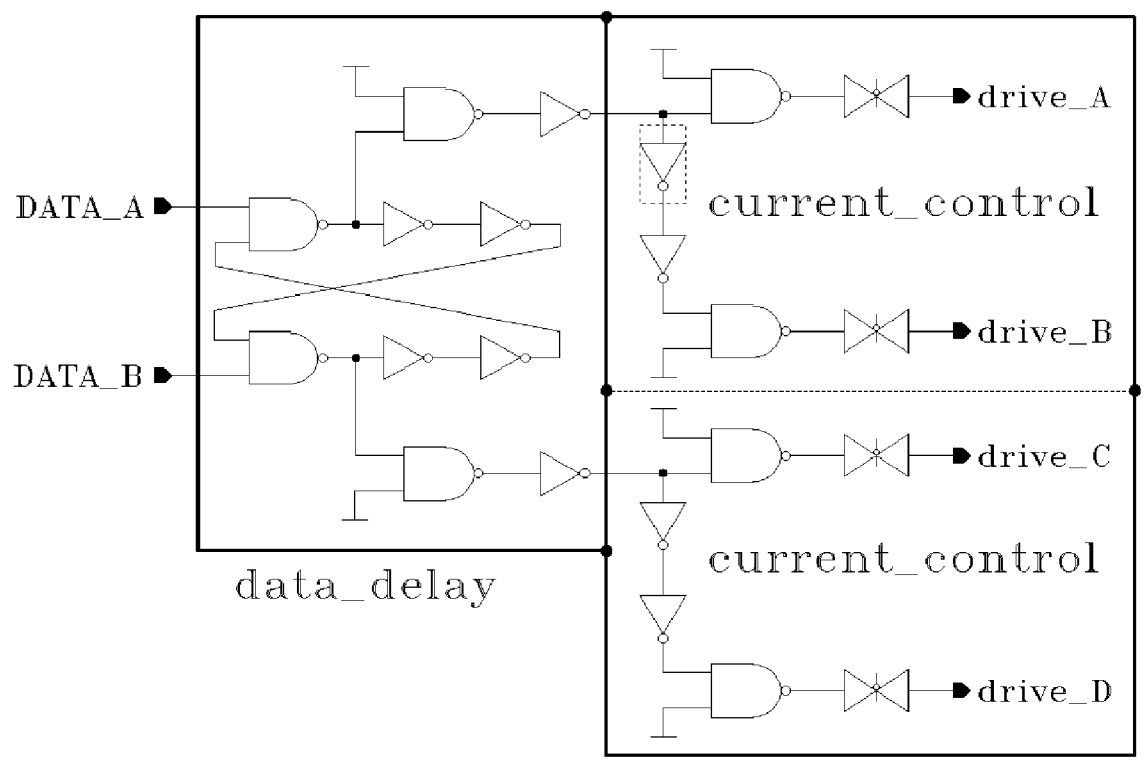
FIG. 4 is a schematic view of current control signal circuit according to above preferred embodiment of the present invention.
Figure 5:
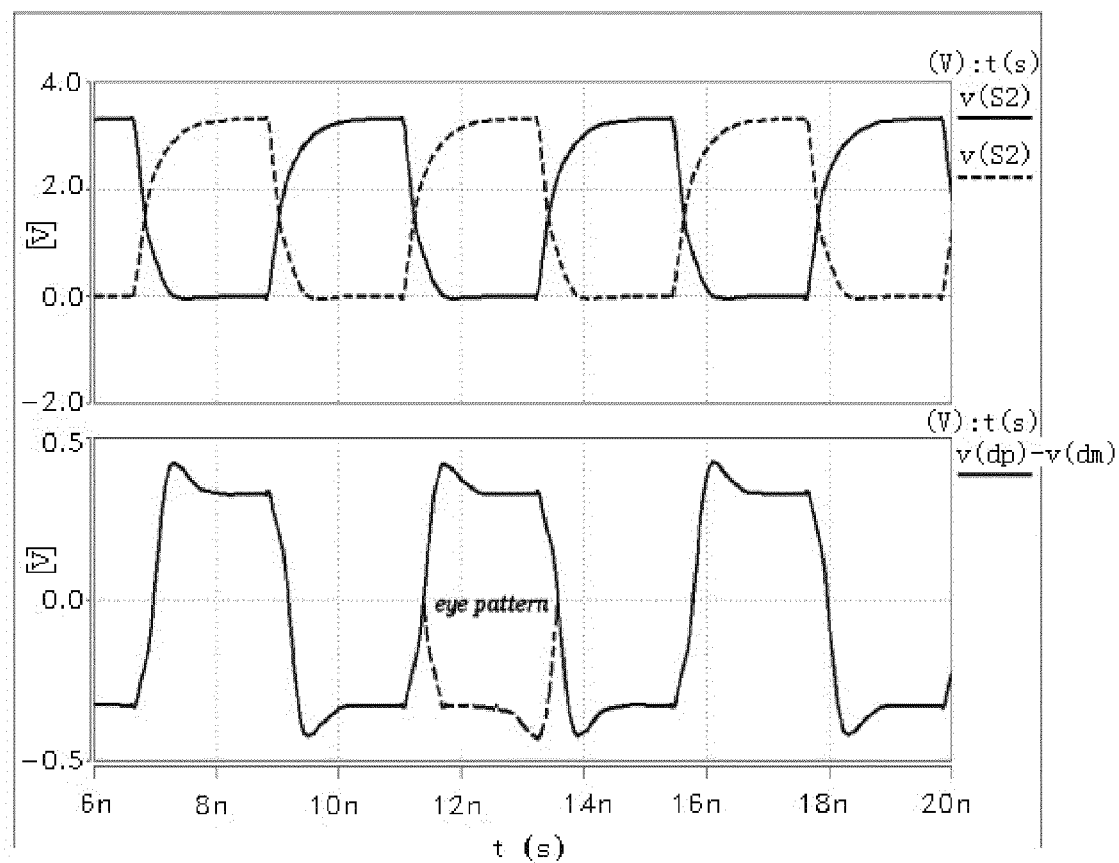
FIG. 5 is a diagram of an output of the conventional RC controlled high speed data transmission and an eye pattern.
Figure 6:
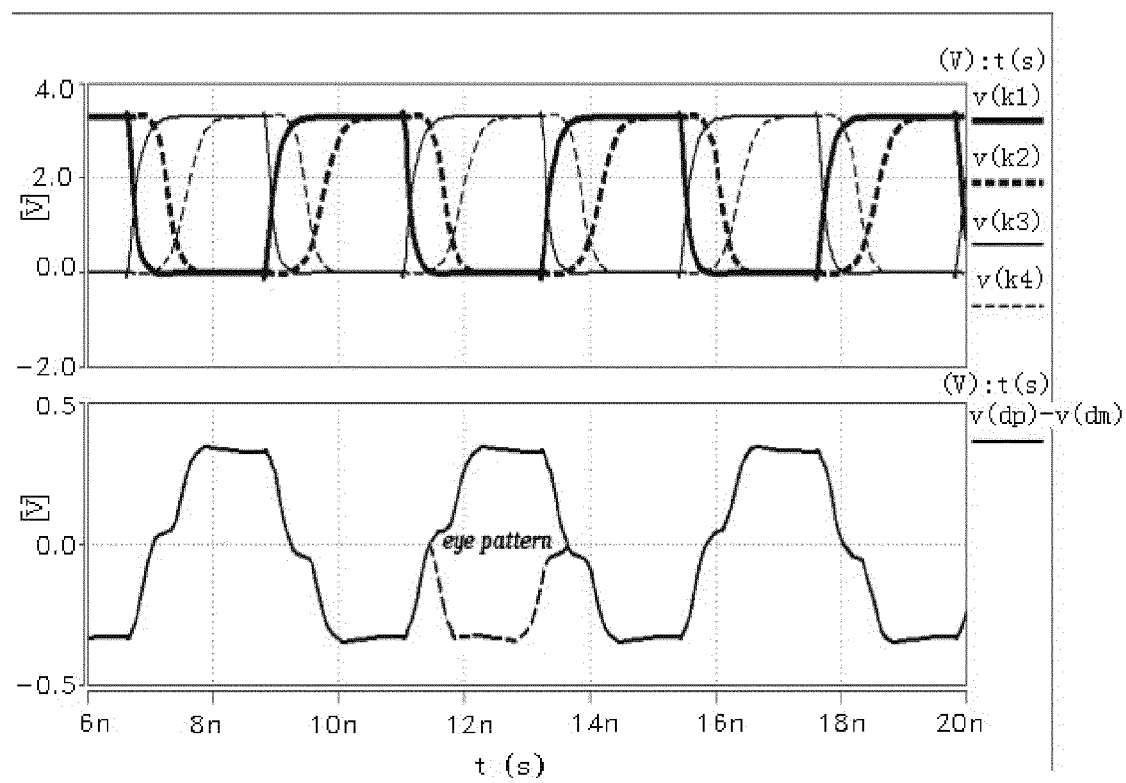
FIG. 6 is a diagram of an output of a conventional current segmentation circuit controlled high speed data transmission and an eye pattern thereof is illustrated.

As shown in FIG. 4, the four current source controlling switches structure further comprises a data delay structure data_delay and a current control structure current_control. Referring to v(drive_A) and v(drive_C) in FIG. 7, the data delay structure adopts RS delay model that can quickly response the input falling edge to produce a pair of differential delay signals. This pair of delay signals produces a pair of "gate" control signals. Referring to v(drive_A), v(drive_B) and v(drive_C), v(drive_C) in FIG. 7, the current control structure produces two pairs of delayed current control signals to control I1, I2 and I3, I4 respectively. Match the series inverter in the data delay structure with the series inverter in the current control structure, so that the delay of the current control signal is matched with the delay of the data.

Figure 7:
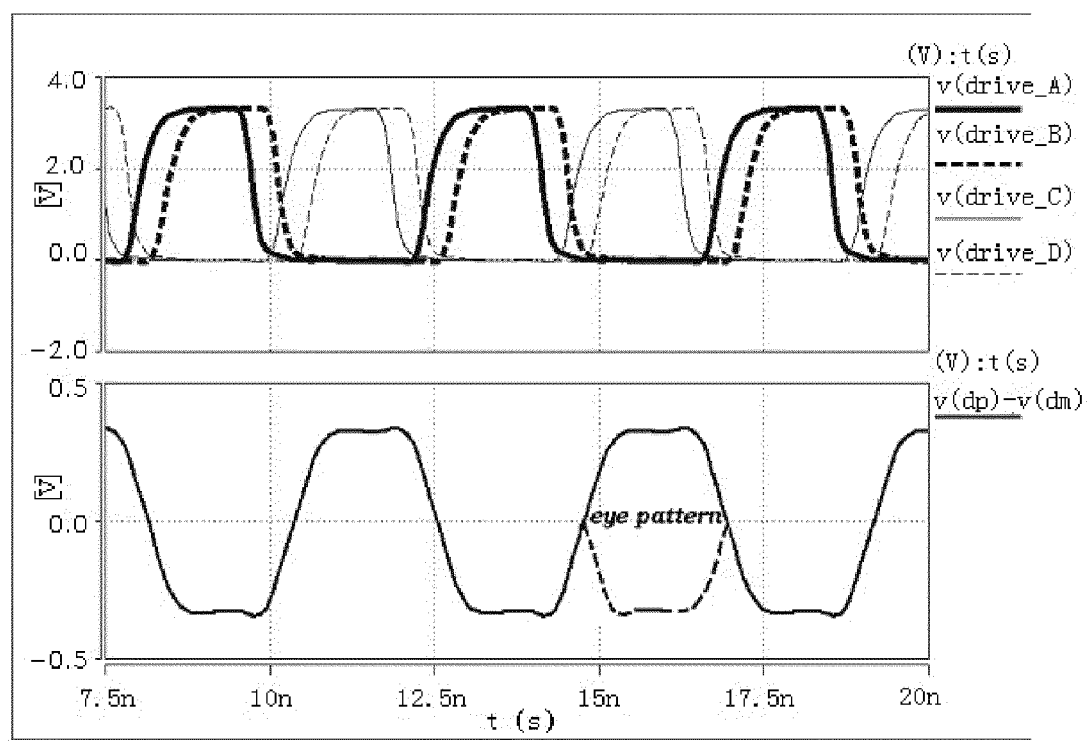
FIG. 7 is a diagram of an output and eye pattern of the high speed data transmission according to above preferred embodiment of the present invention.

Referring to FIG. 7 of the drawings, an output and eye pattern of the high speed data transmission is illustrated, wherein v(drive_A), v(drive_B), v(drive_C), and v(drive_D) are the "gate" control signals of the four PMOS switches, and v(dp)−v(dm) is the differential data. It can be seen that the overshoot is greatly depressed and there is no turning point during the rising and falling process. The high speed transmission has high quality eye pattern and have high reliability of data recovery.

Take the rising process of the differential data as an example, the present principle of depressing overshoot and eliminating turning point is illustrated as follows according to FIG. 7. During the fast falling process of v(drive_A), other control signals are not obviously changed, the exponentially increasing current flows into DP line from I1 and I3, the voltage of DM remains unchanged, and the voltage of the differential data exponentially increases about ¼ peak value. During the slow falling process of the v(drive_A), negatively exponentially increasing current flows into DP line from I1 and I3. However, at the same time, with the fast falling of v(drive_B) and fast rising of v(drive_C), the positively exponentially increasing current flows into DP line from I2 and I4, and the voltage of the differential data exponentially increase about ½ peak value. During the slow falling process of v(drive_B), v(drive_D) increases quickly, the current changing from the positively exponentially increasing current to the negatively exponentially increased current flows into DP line, and the voltage of the differential data exponentially increase about ¼ peak value. Due to the differential data voltage is kept in the rising process to the peak value, so that the overshoot is greatly depressed. As mentioned above, the data delay is matched with the current control signal delay, so that there will be no turning point in the present invention.

The present invention introduces a data delay structure having a RS delay model and matches the delay of the current control signal and the delay of the data, so as to depress the overshoot and eliminate the turning point during the rising and falling time of the high speed data signal. In the test, the high speed transmission data has good eye pattern, which prove the objective of the present invention.

What is claimed is:

1. A current segmentation circuit for optimizing output waveform from high speed data transmission interface, comprising:

four current sources I1, I2, I3 and I4;
four current control switches K1, K2, K3 and K4;
a first resistor; and
a second resistor,
wherein a first end of said current source I1, a first end of said current source I2, a first end of said current source I3 and a first end of said current source I4 are connected with a power supply, a second end of said current source I1 and a second end of said current source I3 are connected with a first end of said current control switch K1 and a first end of said current control switch K3, a second end of said current source I2 and a second end of said current source I4 are connected with a first end of said current control switch K2 and a first end of said current control switch K4, a second end of said current control switch K1 and a second end of said current control switch K2 are connected with a first differential data line and a first end of said first resistor, a second end of said current control switch K3 and a second end of said current control switch K4 are connected with a second differential data line and a first end of said second resistor, and a second end of said first resistor and a second end of said second resistor are connected with ground,
whereby a high speed emission current is segmented by said current segmentation circuit for controlling a rising and falling time of a high speed transmission datum to match a delay of a segmented current control signal and a delay of a datum.

2. The current segmentation circuit, as recited in claim 1, wherein I1+I2=I3+I4.

3. The current segmentation circuit, as recited in claim 2, wherein each of said current sources comprises at least one current source element.

4. The current segmentation circuit, as recited in claim 3, wherein said current sources I1, I2, I3 and I4 are mirror current sources.

5. The current segmentation circuit, as recited in claim 3, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

6. The current segmentation circuit, as recited in claim 2, wherein said current sources I1, I2, I3 and I4 are mirror current sources.

7. The current segmentation circuit, as recited in claim 6, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

8. The current segmentation circuit, as recited in claim 2, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

9. The current segmentation circuit, as recited in claim 1, wherein each of said current sources comprises at least one current source element.

10. The current segmentation circuit, as recited in claim 9, wherein said current sources I1, I2, I3 and I4 are mirror current sources.

11. The current segmentation circuit, as recited in claim 10, wherein I1=I2=I3=I4.

12. The current segmentation circuit, as recited in claim 11, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

13. The current segmentation circuit, as recited in claim 9, wherein I1=I2=I3=I4.

14. The current segmentation circuit, as recited in claim 13, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

15. The current segmentation circuit, as recited in claim 9, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

16. The current segmentation circuit, as recited in claim 1, wherein said current sources I1, I2, I3 and I4 are mirror current sources.

17. The current segmentation circuit, as recited in claim 16, wherein I1=I2=I3=I4.

18. The current segmentation circuit, as recited in claim 16, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

19. The current segmentation circuit, as recited in claim 1, wherein I1=I2=I3=I4.

20. The current segmentation circuit, as recited in claim 1, further comprising a data delay structure and a current control structure, wherein said data delay structure adopts RS delay model that can quickly response an input falling edge to produce a pair of differential delay signals, which produce a pair of "gate" control signals; said current control structure produces two pairs of delayed current control signals to control I1, I2 and I3, I4, respectively.

* * * * *